Patented Dec. 24, 1940

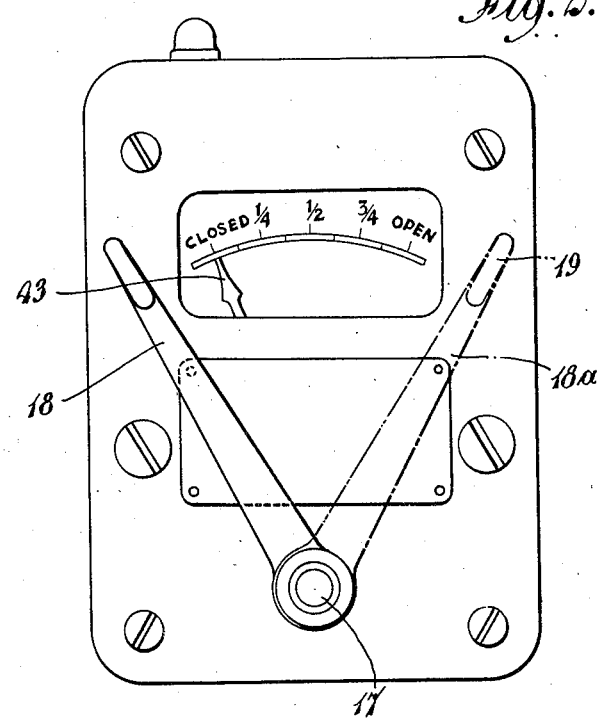
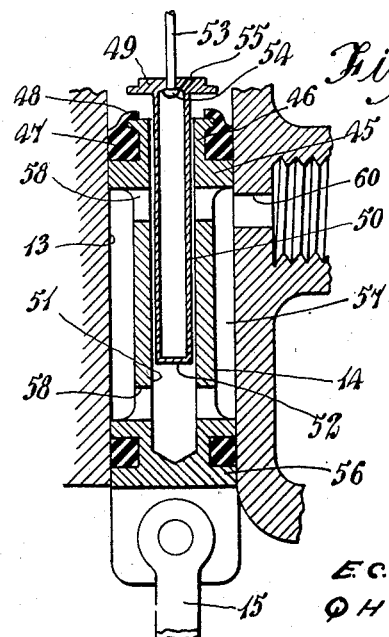

2,225,768

UNITED STATES PATENT OFFICE 2,225,768

REMOTELY ACTING LIQUID PRESSURE PO-SITION-INDICATING DEVICE

Edward Claude Shakespeare Clench and Quintin Henry Healey Kahl, London, England, assignors to Automotive Products Company Limited, London, England Application March 27, 1939, Serial No. 264,458
In Great Britain March 29, 1938

11 Claims. (Cl. 116—124)

This invention relates to indicators and more particularly to a device for indicating the adjusted position of a movable member remote therefrom by the employment of hydraulically operated means. In particular, the invention seeks to provide a form of liquid pressure remote indicating device which is unaffected by temperature changes and the consequent variations which occur in the volume of the working liquid.

According to the present invention a hydraulic position-indicating device comprising an indicator connected by a pipe line with a remotely disposed unit having a chamber of variable volume, has the pipe line connected with a pump adapted to inject a predetermined volume of liquid into the device when an indication is required, the arrangement being such that any portion of said liquid that cannot enter the remote unit causes the indicator to be actuated. Thus, the device may comprise an indicator incorporating a liquid-filled variable volume chamber which is resiliently loaded so that it is caused to contract when the liquid pressure falls below a predetermined value and in expanding actuates indicating means, a remote unit containing a chamber of variable volume, the capacity of which is determined by the position of the remote movable member, which position is to be indicated, said chamber being resiliently loaded but capable of resisting only a liquid pressure less than that which will overcome the resilient loading of the indicator, a pipe line connecting together the two variable volume chambers, and means for injecting a predetermined quantity of liquid into the system whereby the chamber in the remote member is filled and any surplus liquid operates the indicator. The capacity of the remote chamber, of course, is subject to variation dependent upon the adjusted position of the movable member concerning which position data is sought.

Preferably both of the variable volume chambers, the pipe line, and the means for injecting the predetermined quantity of liquid are all connected with a reservoir when the system is inoperative, thus ensuring that the parts are always maintained fully charged with liquid and that they are not subjected to stress due to expansion of the liquid should the temperature rise. Conveniently the remote unit comprises a piston slidable in a cylinder against the action of a spring, and arranged to have its stroke limited by a separate movable abutment connected operatively with the movable member. Further, the indicator unit may comprise an indicator piston arranged to actuate the indicating means, said piston being movable in a cylinder under the action of liquid pressure and against the action of a spring which requires a greater liquid pressure to overcome it than does the spring acting upon the piston of the remote unit. The indicating means, if desired, may comprise an angularly movable member such as a pointer which is connected with the indicator piston by an arm. For injecting the predetermined quantity of liquid a pump may be provided comprising a piston slidable in a cylinder and incorporating a valve device whereby the initial movement of the pump piston from its inoperative position disconnects a reservoir from the pipe line and its associated variable volume chambers. This valve device can conveniently be arranged with adjusting means whereby the displacement of the pump piston can be regulated in order that a correct indication may be obtained. For this purpose the pump piston can be provided with a hollow-stemmed mushroom valve which is adapted to be engaged and pulled off its seat by a wire or rod attached to the cylinder in an adjustable manner.

One form of position-indicating device according to the invention is illustrated in the accompanying drawings in which Figure 1 is a sectional rear elevation taken through the indicator unit and also the remote unit, the pipe line connection and the reservoir being shown diagrammatically to a reduced scale;

Figure 2 is a front elevation of the indicator unit: and

Figure 3 is a sectional elevation to an enlarged scale showing the details of the pump piston.

Figure 1:
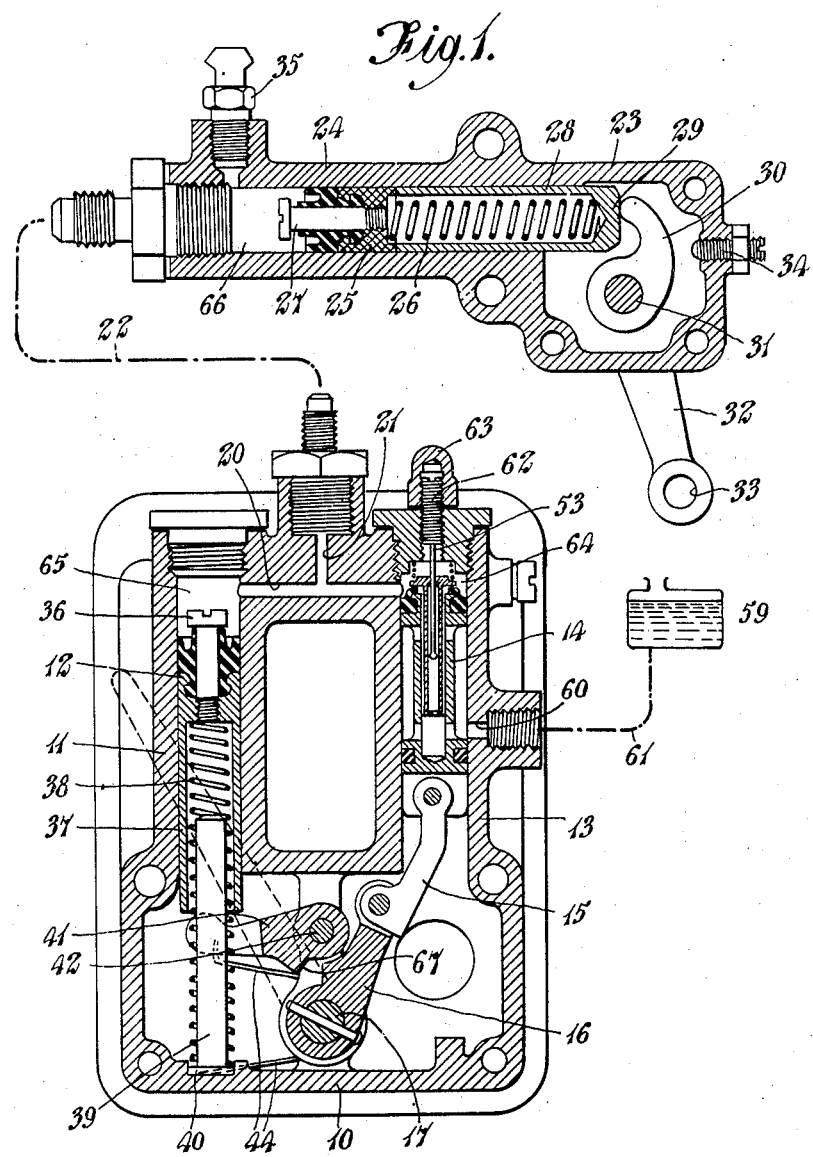

In Figure 1 the parts of the indicator unit and remote unit are shown in the positions that they occupy when the device is operative, that is when the pump piston has been actuated in order to obtain a reading from the indicator.

The indicator unit comprises a body 10 which is formed with an indicator cylinder 11 having an indicator piston 12 and with a pump cylinder 13 fitted with a pump piston indicated generally at 14. The bottom part of this piston is grooved for the accommodation of a link 15 which connects the piston with an arm 16 secured to a spindle 17 extending through the front of the device as shown in Figure 2. A lever 18 is attached to the extremity of the spindle 17, and has a finger grip 19 whereby the lever can be moved from its inoperative position indicated in full lines to the position 18a corresponding to the position occupied by the link 15 and arm 16 in Figure 1. Thus with the lever 18 in the position shown in Figure 2 the pump piston 14 is completely retracted, while movement of the lever to the position 18a causes said piston to be advanced, thus injecting a predetermined volume of liquid into the pipe line and indicator cylinder. In order to obtain this effect the upper parts of the indicator cylinder 11 and pump cylinder 13 are connected together by a passage 20 which has a branch 21 connected with a pipe line 22 leading to a remote unit 23. This unit is formed with a cylinder 24 having a piston 25 which is urged forwardly by a relatively light coiled compression spring 26, a stop screw 27 being fitted in order to determine the end or inoperative position of the piston 25. The other end of the spring 26 is accommodated within a slidable abutment member 28, capable of movement independently of piston 25, which is tubular for the major part of its length but is closed at one end 29 so as to form a support for the spring 26 and also a surface with which cooperates the upper extremity of a curved arm 30. This arm is secured to a spindle 31 which extends to the exterior of the remote unit, and is fitted with another arm 32 having at its end an eye 33 adapted for connection to the movable member (not shown) whose position is to be indicated. Consequently, at any one time the arm 32 occupies a definite position determined by the position occupied by the movable member. It will be seen that arm 30 is capable of movement in an arc limited on one side by set screw 34 and on the other side by the cumulative length of abutment member 28, piston 25 and that portion of stop screw 27 which extends axially beyond the end of piston 25. Thus, when the system is not under pressure stop screw 27 of piston 25 will always rest against the end of cylinder 24 nearest pipe 22, while abutment member 28 will be held always by a spring 26 against member 30, the distance between piston 25 and abutment member 28 at any given time being determined by the position of curved arm 30. Thus, if curved arm 30 is resting against set screw 34 because of adjustment of the movable member attached to arm 32, piston 25 and abutment 28 will be a maximum distance apart when the system is not under pressure and, consequently, piston 24 will be susceptible to maximum movement when the system is placed under pressure. Of course as the movable member 32 and its curved arm 30 change their position the abutment member 28 correspondingly slides within the cylinder 24, so limiting the possible movement of the piston 25. A bleed plug 35 is provided in the known manner for the purpose of removing air from the system when the latter is being filled with working liquid.

The indicator piston 12 also has a stop screw 36 to limit its upward movement and it is formed with a tubular skirt 37 serving to house a coiled compression spring 38 which is arranged to have a stronger effect than the spring 26 in the remote unit. It will be appreciated that the strength of these two springs is dependent in some measure upon the relative diameters of the indicator cylinder 11 and the cylinder 24 of the remote unit, as if these areas are made unequal it is necessary that some compensation should correspondingly be effected with regard to the strength of the springs. In practice, therefore, it is important that the springs should be so arranged in conjunction with the cross-sectional areas of the pistons 12 and 25 that if liquid of increasing pressure is admitted to the pipe line 22 it will first of all overcome the spring 26, duly moving the piston 25 as far as is permitted by the abutment member 28 and will then and only then start moving the piston 12 against the spring 38.

The spring 38 at its lower part surrounds a pin 39 which is provided to prevent the spring from buckling and which has a head 40 which is held securely against the bottom of the body 10 by means of said spring. Vertical movement of the indicator piston 12 is communicated to a bifurcated arm 41 carried by a spindle 42 which also carries an angularly movable pointer 43 as seen in Figure 2. The arm 41 is maintained in contact with the lower end of the skirt portion 37 by means of a torsion spring indicated at 44.

The constructional details of the pump piston 14 will be seen more clearly from Figure 3, which shows the piston in its fully retracted or inoperative position. The piston itself is substantially dumb-bell shaped, and its upper head 45 is formed with an upstanding undercut flange 46 serving to secure in position a rubber packing washer 47 which is continued upwardly beyond the flange 46 so as to form an annular seat 48 for the head 49 of a mushroom valve. This valve has a tubular stem 50 which extends into a bore 51 formed in the piston 14, the lower end 52 of said stem being closed while the upper part adjacent the head is constricted as shown. The diameter of this constriction is sufficient to take slidably a wire or rod 53 but is unable to pass a knob 54 formed upon the lower end of said wire or rod 53. A passageway 55 places the interior of the stem 50 in free communication with the working space above the piston 14 in order that movements of the valve 49, 50 relative to the rod or wire 53 shall not be impeded. The piston 14 also has a lower head 56 sliding in the cylinder 13, and the space 57 between the two heads 45 and 56 is in permanent communication on the one hand with the bore 51 through passages 58 and on the other hand with a reservoir 59 (see Figure 1) through the medium of a passageway 60 and a pipe 61. At its upper end the wire 53 is secured to a grub screw 62 which is screwthreaded into the upper end of the cylinder 13 so as to be adjustable axially thereof, a lock nut in the form of a cap 63 being provided to prevent leakage of liquid past the threads.

It will be seen that the pipe line 22 in conjunction with the passages 20 and 21 connect together three separate chambers having variable volumes, namely, a chamber 64 above the pump piston 14, a chamber 65 defined by the indicator piston 12 and the corresponding cylinder 11 and finally a variable volume chamber 66 disposed within the remote unit 23. When the system is inoperative, the pump piston 14 is fully retracted but the chambers 65 and 66 have their minimum volume owing to the effect of the springs 38 and 26 upon the pistons 12 and 25 respectively. As the arm 32 moves with the member whose position is to be indicated, the abutment member 28 is correspondingly shifted, and the possible travel of piston 25 is thus correspondingly modified. When an indication is required the lever 18 of the indicator unit is moved angularly as far as possible, so that it occupies the position 18a. The initial rising movement of the pump piston 14 causes the seat 48 to engage with the head 49 of the mushroom valve, thus shutting off the chamber 64 from the reservoir 59 so that a predetermined volume of liquid is discharged under pressure from the chamber 64. This liquid can most easily pass through the pipe line 22 and enter the chamber 66 in the remote unit, thus forcing back the piston 25 until it contacts with the abutment member, the quantity of liquid received in this chamber 66 depending upon the position of the abutment 28 and therefore the position of the movable member whose position is to be indicated. If the arm 32 and the movable member coupled thereto happen to be in such a position that the curved arm 30 is separated from the stop screw 34 a portion of the injected liquid is unable to enter the remote unit and has its pressure built up by the force exerted through the lever 13 in its action through piston 14 until it is able to overcome the force of the spring 38, and said liquid thereupon presses down the indicator piston 12 to an extent proportional to the distance of curved member 30 from stop screw 34 regardless of the position that curved member 30 may happen to occupy at the time piston 14 is actuated. The movement of the piston 12 is, of course, transmitted to the pointer 43 and therefore serves to show the position of the arm 32. Thus, when curved member 30 is resting against set screw 34, piston 25 may be moved to such an extent before it strikes abutment member 28 that piston 12 will not be moved at all and consequently the indicator will read as illustrated in Figure 2. The pivots of the link 15 and the arm 16 are so arranged that these parts assume or just pass a dead centre position, so that the lever 18 can be left in its operative position if necessary in order to secure a continuous indication by means of the pointer 43. In this connection it will be noted that the arm 41 is formed with an abutment 67 which is arranged to cooperate with the arm 16 when the indicator piston 12 is in the lowest position due to the whole of the liquid expelled by the pump piston 14 passing into the indicator cylinder 11. In these circumstances any expansion of the liquid due to rise of temperature while the system is operative tends to jam the indicator piston 12 against the bottom of the casing 10, but to avoid this, should expansion occur, the abutment 67 "breaks" the toggle linkage formed by the members 15 and 16, thus enabling all of the pistons to resume their inoperative positions under the action of the springs 26 and 38, the pump piston 14 being returned by the liquid pressure.

The accuracy of the indication depends, of course, upon the quantity of liquid which is injected into the pipe line 22 and indicator cylinder 11 at each operation, and this volume can be accurately regulated by adjusting the position of the wire 53. If the effective length of the wire is reduced the valve 49, 50 will close later in the stroke and the delivery of liquid will be reduced.

The indicating device hereinbefore described is, of course, given merely as an example, and it will be understood that the construction of the remote and indicating units may be modified in many ways without departing from the invention.

We claim:

1. A liquid pressure system for indicating the position of a remote member comprising, an indicator, a liquid filled variable volume chamber operatively associated therewith, said chamber being resiliently loaded to contract when the pressure therein falls below a predetermined value and to expand and actuate the indicator when the pressure exceeds said predetermined value, a remote variable volume chamber which is also resiliently loaded to contract but is capable of resisting only a liquid pressure less than that resisted by the loading of the first-mentioned variable volume chamber, means to limit the expansion of the remote variable volume chamber, the position of said means being determined by the position of the remote member, a pipe line connecting together the two variable volume chambers, and means for injecting a predetermined quantity of liquid into the system, whereby the remote chamber is filled as far as permitted by the remote member acting through the limiting means and the surplus liquid operates the indicator by passing into and causing expansion of said first-mentioned chamber.

2. A liquid pressure system for indicating the position of a remote member comprising, an indicator, a liquid filled variable volume chamber operatively associated therewith, said chamber being resiliently loaded so that it is caused to contract when the liquid pressure falls below a predetermined value, the expansion thereof effecting movement of said indicator, a remote variable volume chamber which is also resiliently loaded to contract but is capable of resisting a liquid pressure less than that resisted by the loading of the first-mentioned variable volume chamber, means to limit the expansion of the remote variable volume chamber, the position of said means being determined by the position of the remote member, a pipe line connecting together the two variable volume chambers, and means for injecting a predetermined quantity of liquid into the system to fill the remote variable volume chamber as far as permitted by the limiting means, any surplus liquid operating the indicator by causing expansion of the first-mentioned variable volume chamber, said means for injecting the predetermined quantity of liquid comprising a reservoir, a cylinder and a pump piston which is slidable in the cylinder and incorporates a valve device, whereby the initial movement of the pump piston from its inoperative position disconnects the reservoir from the pump line and its associated variable volume chambers.

3. A liquid pressure system for indicating the position of a remote member comprising an indicator, a hydraulic motor to operate said indicator responsive to liquid pressures greater than a predetermined pressure and in proportion to the volume of liquid supplied, a remotely disposed hydraulic device capable of absorbing a volume of liquid at a pressure lower than the said predetermined pressure, said volume being dependent on the position to be indicated, a pipe line connecting the said hydraulic motor and device, and a pump adapted to inject a predetermined volume of liquid into the pipe line so that part of said liquid is absorbed by the remotely disposed hydraulic device depending upon the position of the remote member and the remainder operates the indicator.

4. A liquid pressure position indicating system according to claim 3 wherein the hydraulic motor and device comprise piston and cylinder units, said pistons being spring pressed to enable the hydraulic device to respond to liquid at a pressure below the said predetermined value, and the hydraulic motor to respond to pressure above said predetermined value.

5. A liquid pressure position indicating system according to claim 3 having a reservoir, the pump being arranged so that when it is in an inoperative state it connects said reservoir with the hydraulic device, the hydraulic motor and the pipe line.

6. A liquid pressure position indicating system according to claim 3, wherein the pump for injecting the predetermined quantity of liquid comprises a pump piston, an external lever to actuate the piston and a linkage connecting the lever with the piston and arranged to assume a substantially dead centre position when the pump piston is at the termination of its operative stroke.

7. A liquid pressure position indicating system according to claim 3, wherein the pump for injecting the predetermined quantity of liquid comprises a pump piston, an external, manually operated lever adapted to be moved angularly between predetermined limits to move said piston, and adjusting means for said piston whereby the displacement of the latter caused by the full movement of the actuating means may be regulated.

8. A liquid pressure system for indicating the position of a remote member comprising, an indicator, a liquid filled variable volume chamber operatively associated therewith, said chamber being resiliently loaded to contract when the pressure therein falls below a predetermined value and to expand and actuate the indicator when the pressure exceeds said predetermined value, a reservoir, a remote variable volume chamber which is also resiliently loaded to contract but is capable of resisting only a liquid pressure less than that resisted by the loading of the first-mentioned variable volume chamber, means to limit the expansion of the remote variable volume chamber, the position of said means being determined by the position of the remote member, a pipe line connecting together the two variable volume chambers, and a pump for injecting a predetermined quantity of liquid into the system whereby the chamber associated with the remote member is filled as far as permitted by the limiting means while only surplus liquid operates the indicator by causing expansion of the first-named variable volume chamber, the pump having a valve which is open when said pump is in its inoperative position so as to place the pipe line in communication with the reservoir, adjustable means being provided to actuate said valve so that the position at which the valve closes can be adjusted in order to regulate the volume of the predetermined quantity of liquid injected by a single full stroke of the pump piston.

9. A liquid pressure position indicating system according to claim 8, wherein the pump comprises a cylinder, a piston slidable therein, a mushroom valve in the piston, and positive opening means adapted to open said valve as the piston reaches the termination of its return stroke, thereby opening a passageway leading from the back part of the piston which is in permanent communication with the reservoir, to the front part of said piston.

10. A liquid pressure system for indicating the position of a remote member comprising, an indicator, a liquid filled variable volume chamber operatively associated therewith, said chamber being resiliently loaded to contract when the pressure therein falls below a predetermined value and to expand and actuate the indicator when the pressure exceeds said predetermined value, a reservoir, a remote variable volume chamber which is also resiliently loaded to contract but is capable of resisting only a liquid pressure less than that resisted by the loading of the first-mentioned variable volume chamber, means to limit the expansion of the remote variable volume chamber, the position of said means being determined by the position of the remote member, a pipe line connecting together the two variable volume chambers, and a pump cylinder and piston for injecting a predetermined quantity of liquid into the system whereby the chamber in the remote member is filled as far as permitted by the limiting means and any surplus liquid operates the indicator, the pump piston being provided with a mushroom valve having positive opening means which becomes operative as the piston reaches the end part of its return stroke, thereby opening a passageway leading from the front part of the piston to the reservoir with which the back part of the piston is in permanent communication, said positive opening means comprising a rod or wire extending through the working space of the pump and arranged to be adjusted from the exterior thereof.

11. A liquid pressure position indicating system according to claim 10, wherein the stem of the mushroom valve is hollow and is formed with a constriction adjacent the front part of the piston, the wire having a laterally projecting portion at its end, which projecting portion engages with the said constriction to open the valve.

EDWARD CLAUDE SHAKESPEARE CLENCH.
QUINTIN HENRY HEALEY KAHL.